United States Patent [19]

Trouplin

[11] Patent Number: 4,900,227
[45] Date of Patent: Feb. 13, 1990

[54] WIND POWER OF HYDRAULIC POWER MACHINE WITH AXIAL FEED, RADIAL OUTFLOW, AND VARIABLE GEOMETRY VANES, AND PROJECTILES FITTED WITH WIND POWER OR HYDRAULIC POWER MACHINES OF THIS TYPE

[75] Inventor: Claude Trouplin, La Ferte St Aubin, France

[73] Assignee: Thomson-Brandt-Armements, Boulogne Billancourt, France

[21] Appl. No.: 365,411

[22] Filed: Jun. 13, 1989

[30] Foreign Application Priority Data

Jun. 14, 1988 [FR] France .............................. 88 07907

[51] Int. Cl.⁴ .............................................. F01D 7/02
[52] U.S. Cl. ............................ 416/132 B; 416/186 A; 416/240
[58] Field of Search ........... 416/186 A, 240 A, 132 B, 416/188, 132 R, 132 A; 415/140 (U.S. only), 141 (U.S. only)

[56] References Cited

U.S. PATENT DOCUMENTS

| 1,427,391 | 8/1922 | Johns | 416/186 A X |
| 1,433,995 | 10/1922 | Fowle | 416/186 A X |
| 1,961,228 | 6/1934 | Knox | 416/186 A X |
| 2,406,499 | 8/1946 | Jandasek | 416/132 R |
| 2,570,862 | 10/1951 | Rosenkrans et al. | 416/132 R X |
| 2,766,964 | 10/1956 | Almquist et al. | 416/132 R X |
| 3,006,534 | 10/1961 | McDonald | 416/186 A |
| 3,856,432 | 12/1974 | Campagnuolo et al. | 416/188 X |
| 4,086,023 | 4/1978 | Morgan | 416/132 B |
| 4,161,371 | 7/1979 | Sheppa | 416/186 A X |
| 4,522,600 | 6/1985 | Jöst | 416/240 A |
| 4,540,337 | 9/1985 | Olsen | 416/186 A X |

FOREIGN PATENT DOCUMENTS

| 0095270 | 11/1983 | European Pat. Off. . | |
| 2124804 | 12/1972 | Fed. Rep. of Germany | 416/132 R |
| 782935 | 7/1935 | France | 416/143 |
| 1375168 | 9/1964 | France | 416/132 R |
| 2442978 | 6/1980 | France . | |
| 223000 | 12/1983 | Japan | 416/143 |
| 865169 | 4/1961 | United Kingdom | 416/132 R |
| 1544916 | 4/1979 | United Kingdom | 416/132 A |

Primary Examiner—Everette A. Powell, Jr.
Attorney, Agent, or Firm—Oblon, Spivak, McClelland, Maier & Neustadt

[57] ABSTRACT

A wind power or hydraulic power machine with axial feed, radial outflow and variable geometry vanes is disclosed. This machine has a support that channels the flow, in limiting the escape flows to the maximum, and provides protection in giving to this wind power or hydraulic power machine excellent resistance to axial stresses, and plays the role of an inertia wheel.

4 Claims, 1 Drawing Sheet

WIND POWER OF HYDRAULIC POWER MACHINE WITH AXIAL FEED, RADIAL OUTFLOW, AND VARIABLE GEOMETRY VANES, AND PROJECTILES FITTED WITH WIND POWER OR HYDRAULIC POWER MACHINES OF THIS TYPE

BACKGROUND OF THE INVENTION

1. Field of the Invention

The invention concerns a wind power or hydraulic power machine with axial feed, radial outflow and variable geometry vanes. It also concerns the application of this machine to projectiles.

A wind power or hydraulic power machine is an element capable of converting the energy of hydraulic or aerodynamic flows into mechanical rotational energy.

2. Description of the Prior Art

As a rule, these elements can be classified under two categories, depending on whether their geometry is fixed or, on the contrary, variable. Each of these categories has advantages and drawbacks.

FIG. 1 gives a schematic view of a prior art type of wind power or hydraulic power machine belonging to the so-called variable geometry category or, more precisely, of the type having deformable vanes. In this figure, arrows are used to show the incident flow (4), then the flow (5) driving the vanes (3), separated by the deflector (1) and the flow (6) going out from the wind power or hydraulic power machine. As this FIG. 1 shows, the vanes (3) are connected to the support (2) only by their end. The effect of this, given the elasticity of the material, is to permit an expansion of the vanes (3) when they are subjected to centrifugal force and to the pressure of the driving flow (5). The result of this deformation is that, from a certain rate of incident flow (4) onwards, the rotational speed of the wind power or hydraulic power machine tends to remain stable. By this fact itself, an effect of speed regulation is obtained, which can be very useful depending on the mechanism driven by the wind power or hydraulic power machine.

However, this architecture has two major drawbacks. Firstly, the vanes (3) are relatively brittle because they are fixed to their supports (2) only by their ends. The vanes thus mounted in an protruding position can be particularly vulnerable to axial stresses such as, for example, inertial stresses in the case of a system propelled with high acceleration. Secondly, this architecture shows low efficiency under light operation due to the fact that the flow (5) tends to escape from the space between two vanes (3), as shown by the escape flow (6').

FIG. 2 gives a schematic view of a prior art wind power or hydraulic power machine of the so-called fixed-vane (non-deformable vane) category. In this figure, arrows again indicate the incident flow (10), then the flow (11) separated by the deflector (7), which is the driving flow for the vanes (9) and, finally, the flow (12) leaving the wind machine. In this case, the vanes (9) are fixed throughout their length, to their support (8). The result thereof is that the element is very sturdy because of its non-deformable character and that it is more efficient than in the previous case because the escape flow no longer exists. On the other hand, with a wind power or hydraulic power machine structure of this type, it is not possible to obtain a speed regulation effect.

It is an object of the present invention is to overcome the drawbacks of both systems while preserving the advantages of each of them.

SUMMARY OF THE INVENTION

More precisely, the invention concerns a wind power or hydraulic power machine with axial feed, radial outflow and variable geometry vanes, of the type having an inflow, a separator creating a driving flow for the vanes, wherein a base solidly joined to the unit is placed beneath the vanes, each formed by a part fixed to the base and extended by a deformable and movable fin on this very same base, to fulfil at least three functions, namely:

providing for channelling the outflow from the wind power or hydraulic power machine in limiting the risks of escape flow;

providing for a regulation of the speed of the wind power or hydraulic power machine by means of the deformation of the fins of the vanes.

providing mechanical protection to the vanes while, at the same time, enabling their deformation.

BRIEF DESCRIPTION OF THE DRAWING

The invention will be better understood from the following explanations and the appended drawing, wherein.

DESCRIPTION OF A PREFERRED EMBODIMENT

Figure 1:
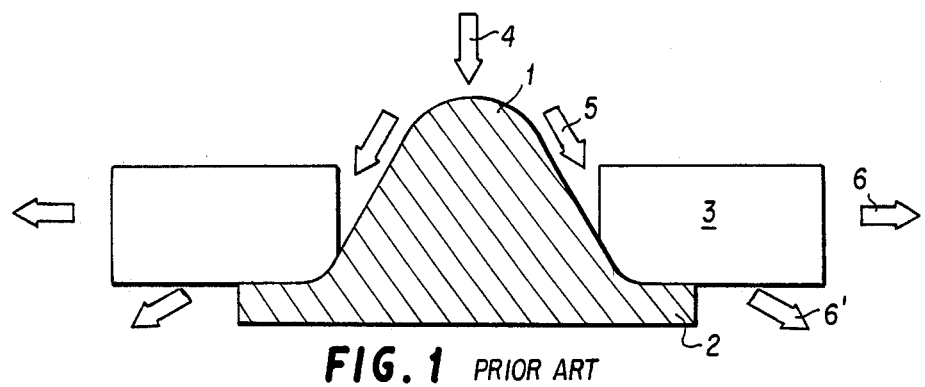
FIGS. 1 and 2 are illustrations of the prior art.
Figure 2:
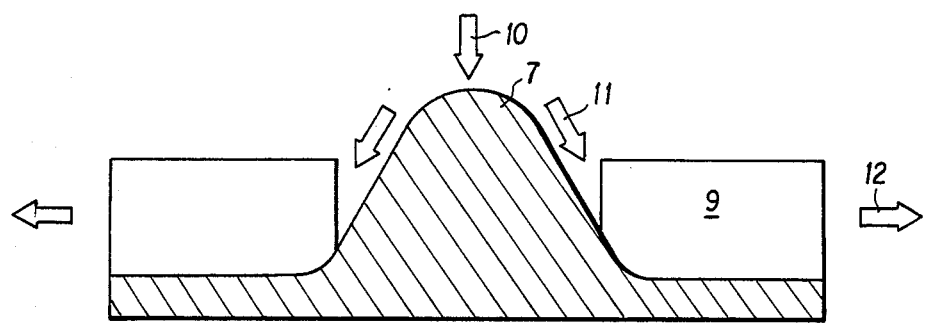
Figure 3:
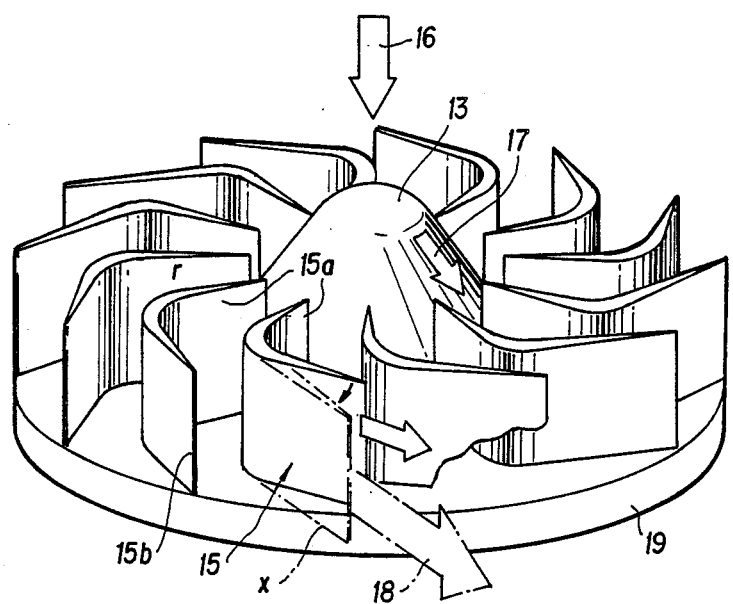
FIG. 3 gives a schematic view of an embodiment of an element of a wind power or hydraulic power machine according to the invention.

As shown in FIG. 3, and according to one characteristic of the invention, the vanes (15) of the wind power or hydraulic power machine have a non-deformable part (15a) and a deformable fin (15b).

The part (15a) is solidly joined to the deflector (13) or to a support (not seen in the figure) is itself solidly joined to this deflector. The fin (15b) is deformable as shown by dots and dashes (x) symbolizing the open position of one of the fin (15b) of a vane (15). The non-deformable part (15a) and the fin (15b) are but one and the same vane. They are connected to each other by a rounded part (r) with a thickness greater than that of the trailing edges of the fin with aerodynamic profile.

According to another characteristic of the invention, the support (19) is positioned beneath the set of vanes (15), in one piece with the deflector (13) so that it enables the fins (15b) to be deformed while, at the same time, preventing any escape flows from occurring. The inflow (16) is separated by the deflector (13) into a driving flow (17) for the vane (15) to give an outflow (18) without any risk of an escape flow that might harm the efficiency of the wind power or hydraulic power machine since the support (19) forms a shield.

The invention therefore concomitantly enables the following to be obtained:

a channelling of the flow (17) between each vane (15) bounded by the support (19);

a deformation of the fins (15b) of the vane (15) that ensures an effect of regulation of the rotational speed for high rates of incident flow (16);

a protection of the vanes (15) by the support (19) which gives the element perfect resistance to axial stresses.

According to another characteristic of the invention, the support (19) fulfils an additional function: it plays the role of an inertia wheel. Its density can be adapted, and even, as the case may be, its dimensions.

The wind power or hydraulic power machine according to the invention, can be made by machining and assembly of parts, but can also be made by molding methods, using appropriate molds.

In a preferred application, a wind power or hydraulic power machine according to the invention is integrated into the fuse in a nose of a projectile. This wind power or hydraulic power machine can be used, for example, for the deferred triggering of the pyrotechnical chain of the projectile. The installing of this wind power or hydraulic power machine according to the invention is done in a standard way.

What is claimed is:

1. A wind power or hydraulic power machine with axial feed, radial outflow and variable geometry vanes, of the type having an inflow, a separator creating a driving flow for the vanes, wherein a base solidly joined to the unit is placed beneath the vanes, each formed by a part fixed to the base and extended by a deformable and movable fin on this very same base, to fulfil at least three functions, namely:
   providing for channelling the outflow from the wind power or hydraulic power machine in limiting the risks of escape flow;
   providing for a regulation of the speed of the wind power or hydraulic power machine by means of the deformation of the fins of the vanes;
   providing mechanical protection to the vanes while, at the same time, enabling their deformation.

2. A wind power or hydraulic power machine according to claim 1, wherein the fixed part is connected to the deformable fin by a rounded part having maximum thickness between the two parts.

3. A wind power or hydraulic power machine according to one of the claims 1 and 2, wherein the set formed by the deflector vane and support is obtained by molding.

4. A projectile with a nose fuse fitted out with a wind power or hydraulic power machine according to claim 1.

* * * * *